INVENTORS
James A. Travilla
James W. Cooke
By Rodney Bedell
atty

United States Patent Office 2,745,358
Patented May 15, 1956

2,745,358

ELECTRIC MOTOR RAILWAY TRUCK

James C. Travilla, University City, Mo., and James W. Cooke, Rosemont, Pa., assignors to General Steel Castings Corporation, Granite City, Ill., a corporation of Delaware Application November 29, 1951, Serial No. 258,886

4 Claims. (Cl. 105—138)

The invention relates to railway rolling stock and more particularly to the mounting of driving motors on truck frames.

The main object of the invention is to provide an efficient support for a motor on the truck frame, as distinguished from the mounting on the truck wheel and axle assembly, which will not interfere with associated equipment.

A more detailed object is to support motors from cross transoms on the truck frame without placing undue stresses on the frame due to rotation or twisting forces applied to the transom because of the weight of the motors.

An associated object is to avoid undesirable increase in weight of the truck frame because of its support of the driving motors.

The invention comprises a beam-like member extending longitudinally of the truck between and rigid with the cross transoms of the truck frame and positioned intermediate a spring plank and bolster movable relative to the truck frame.

In the accompanying drawings illustrating the invention,

Figure 1:
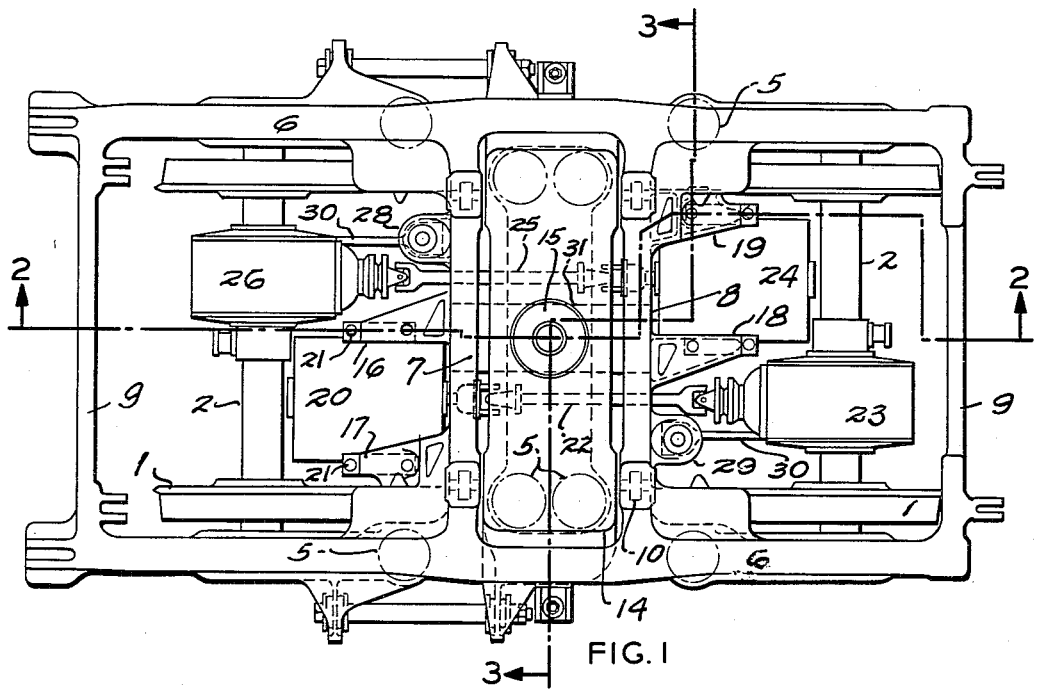
Figure 1 is a top view of a four-wheel truck with a laterally movable bolster, there being a driving motor at each side of the bolster operatively associated with the wheel and axle assembly at the opposite side of the bolster.
Figure 2:
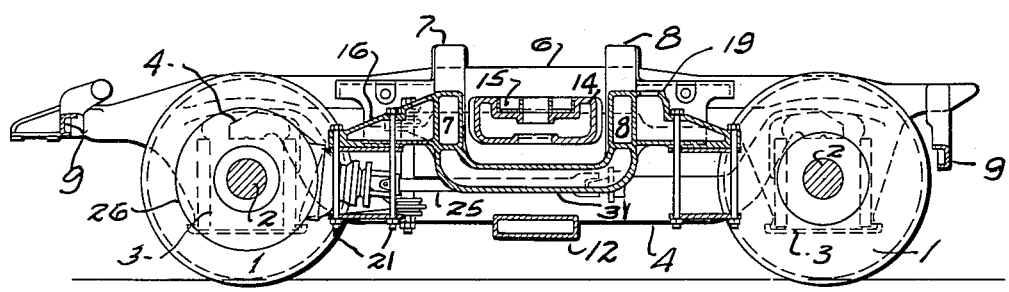
Figure 2 is a longitudinal vertical section taken on the line 2—2 of Figure 1.
Figure 3:
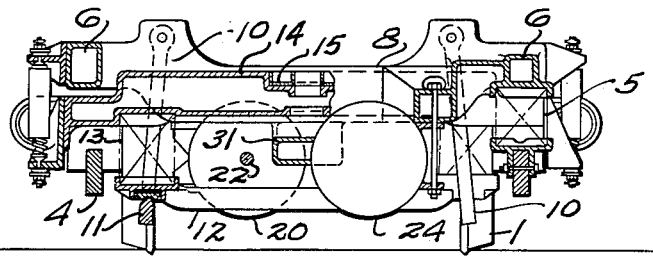
Figure 3 is a vertical transverse section taken on the line 3—3 of Figure 1.

The truck includes the usual assemblies of wheels 1, axles 2, journal boxes 3, equalizers 4, and equalizer springs 5 mounted thereon. The truck frame supported on springs 5 includes longitudinal side members or wheel pieces 6, transverse center transoms 7 and 8 spaced apart longitudinally of the truck, and end transoms 9. Pivotally suspended from transoms 7 and 8 are swing hangers 10, arranged in pairs at opposite sides of the truck, each pair being provided with a cross bar 11 which mounts the spring plank 12 extending from side to side of the truck. Springs 13 are seated upon spring plank 12 and mount the bolster 14 which extends transversely of the truck between transoms 7 and 8 and at substantially the same level. The bolster is provided with a center bearing 15 for supporting the vehicle body, not shown, which comprises the truck load. All of the above described structure is well-known in the art.

A center bracket 16 and a side bracket 17 extend to the left from transom 7. A center bracket 18 and a side bracket 19 extend to the right from transom 8. Brackets 17 and 19 are disposed diagonally of the truck. A motor 20 includes a housing bolted at 21 to brackets 16 and 17 and the motor is connected by a drive shaft 22 to reduction gear 23 mounted on the right hand axle.

A motor 24 is similarly mounted upon brackets 18 and 19 and is similarly connected by a drive shaft 25 to reduction gear 26 mounted on the left hand axle. At the side of each center bracket 16, 18 opposite to side brackets 17 and 19, respectively, is a bracket 28, 29, respectively, adapted to support a torque arm 30 extending from the adjacent gear reduction housing 26, 23.

A tie member 31 extends lengthwise at the center of the truck and is rigid with transoms 7 and 8 and, in effect, center brackets 16, 18 and tie 31 are a continuous structure and comprise cantilever-like supports for the motors. The transoms are braced by tie 31 against overturning forces which might otherwise result from the suspension of the motors on the brackets projecting from the transoms, and from the anchoring of torque arms 30 to brackets 28, 29.

Preferably the frame, bracket and tie members are formed of a unitary casting and are of box section. Bolster 14 and spring plank 12 preferably are of box section also, whereby they may be made relatively shallow, and the height of bolster springs 13 affords space between the bolster and the transom for the passage of tie 31, which extends at a lower level than transoms 7, 8 and brackets 16, 18 in order to provide adequate clearance between the bolster and the spring plank for the tie.

The structure described provides adequate support for the motors and reduction gear torque arms at parts of the truck spaced from the bolster to accommodate lateral movement of the bolster. The motor-supporting brackets are carried by relatively shallow transoms which are rendered effective for their intended purpose by the central tie which clears the bolster and spring plank and with the portions of the transoms adjacent the ends of the tie, and with the brackets, form a beam extending longitudinally of the truck from one motor to the other along a line disposed diagonally of the truck, thereby attaining the objects set forth in the introductory portion of the specification.

The details of the structure may be varied substantially without departing from the spirit of the invention and the exclusive use of those modifications coming within the scope of the claims is contemplated.

What is claimed is:

1. In a railway truck, spaced wheel and axle assemblies, a truck frame supported therefrom and including side members and transverse transoms extending from one side member to the other between said assemblies and spaced apart longitudinally of the truck, bracket structure supported at one end only from each transom substantially throughout the entire depth of the latter and projecting therefrom towards the corresponding end of the truck and between the assembly wheels, driving motors mounted on said bracket structure, reduction gearing mounted on said assemblies, there being operating connections between each of said motors and the gearing on the axle at the opposite end of the truck, and torque arms on said gearing with their outer ends supported from said bracket structures, and a tie between said transoms intermediate the sides of the truck and resisting overturning moments on the transom structures due to the support of said motors and torque arms.

2. In a railway truck, spaced wheel and axle assemblies, a truck frame supported therefrom and including side members and transverse transoms extending from one side member to the other and spaced apart longitudinally of the truck, a member extending longitudinally of the center portion of the truck and connecting the lower portions of said transoms, said transoms and member being of box section, and a bracket supported solely at one end by each transom and projecting from each transom at points adjacent to the end of said member, another bracket projecting from one of said transoms near one side member, another bracket projecting from the other of said transoms near the other side member, a motor supported upon each pair of brackets at the same side of a transom and having a substantial portion positioned between the corresponding wheels and operatively connected to the wheel and axle assembly near the other end of the truck.

3. A railway truck frame formed of a one piece casting and comprising longitudinal side members, transverse transoms connecting said side members and spaced apart and each formed of box-shaped cross section, a tie between said transoms intermediate the side members and formed of box-shaped cross section positioned below the level of the transoms, and motor-support central brackets projecting from said transoms towards the ends of the frame in alignment with said tie longitudinally of the truck and having a depth at the transoms corresponding to the depth of the transoms, there being an additional motor-support bracket projecting from the end portion of each transom and paralleling the corresponding central bracket intermediate the side members, said additional brackets being disposed diagonally of the transverse center line of the truck, there being a torque arm support projecting from each transom at the side of the central bracket opposite to the corresponding additional motor-support bracket.

4. In a railway truck, spaced wheel and axle assemblies, a truck frame supported therefrom and including side members and transverse transoms extending from one side member to the other between said assemblies and spaced apart longitudinally of the truck, a bracket carried solely by and projecting from each transom towards the adjacent assembly and extending a substantial distance into the space between the assembly wheels, a driving motor supported from each of said brackets at points on the latter spaced substantially from the corresponding transom, each motor being operatively connected to the assembly at the opposite end of the truck, and a tie between and bracing said transoms adjacent to the inner ends of said brackets.

References Cited in the file of this patent

UNITED STATES PATENTS

| | | |
|---|---|---|
| 1,105,265 | Frede | July 28, 1914 |
| 1,386,586 | Murray et al. | Aug. 2, 1921 |
| 1,386,587 | Murray et al. | Aug. 2, 1921 |
| 1,782,192 | Brownyer | Nov. 18, 1930 |
| 2,084,891 | Cease | June 22, 1937 |
| 2,132,001 | Dean | Oct. 4, 1938 |
| 2,330,912 | Pflager | Oct. 5, 1943 |
| 2,476,660 | Hammerstrom | July 19, 1949 |